United States Patent [19]

Fischer

[11] Patent Number: 5,053,703
[45] Date of Patent: Oct. 1, 1991

[54] ELECTROMAGNETIC PROBE FOR MEASURING THE THICKNESS OF SKIN LAYERS

[76] Inventor: Helmut Fischer, Industriestrasse 21, 7032 Sindelfingen 6-Maichingen, Fed. Rep. of Germany

[21] Appl. No.: 313,603

[22] Filed: Feb. 21, 1989

[51] Int. Cl.⁵ .................. G01B 7/10; G01R 33/12
[52] U.S. Cl. .................................................. 324/230
[58] Field of Search ............... 324/225, 226, 229, 230, 324/231, 234, 236–241

[56] References Cited

U.S. PATENT DOCUMENTS

4,005,360 11/1977 Ott .................................. 324/230

Primary Examiner—Walter E. Snow

[57] ABSTRACT

In known probes for measuring thin layers, a convex end face presses indentations into the thin layer material being measured, which can falsify the measurement result. The indentation come from the energy destroyed during application, which originates partly from the mass of the probe body and cable. In order to reduce the mass of a probe body upon impact of the probe against a thin material layer being measured as far as possible to zero, a half-pot core together with a coil is made independent and connected compliantly, but returnably, by springs to a probe body. The influence of a probe cable is eliminated by providing in the probe body an active circuit that emits at its output a coded signal that is a function of the layer thickness.

35 Claims, 5 Drawing Sheets

ELECTROMAGNETIC PROBE FOR MEASURING THE THICKNESS OF SKIN LAYERS

The invention relates to single-pole, electromagnetic, active measuring probe for the measurement of thin layers.

BACKGROUND OF THE INVENTION

The measuring probe T3.3 in prior public use, order no. BO1.16.01 of the inventor's firm comes closest to the subject of the invention. Probes and parts of probes of the same generic type are described in German Offenlegungsschrift 3,437,253 and in U.S. Pat. Nos. 2,933,677, 3,761,804, 4,005,360 and 4,041,378. Such measuring probes are used, for example, to measure the thickness of varnish coatings, the layer thickness of metal layers on base metals etc. Representative layer thicknesses lie between several hundred micrometers and several tens of nanometers.

These devices are undoubtedly measuring devices which measure in a nondestructive manner.

It has, however, been noticed that inexplicable measuring errors occur during the measuring of very thin layers and it is known that, when measuring some surfaces which are polished bright, impairment of the gloss occurs in spite of nondestructive measuring.

The points on the layers to be measured on which the convex end face was placed, have been inspected and it has been seen that considerable dents occur there. In manual application, there are both dents and scratch marks, which lead from the place where the convex end face sets down to the actual measuring point. Even if these probes, which are in fact intended for manual operation, are applied carefully using a stand, for example to aluminum, there are indentations. If the aluminum is anodized, the outermost thin lay may collapse, similar to the encrusted surface on old snow when it is trodden on. A representative depth of such impressions is for example around one micrometer. If the layer is, for example, 120 micrometers thick, this of course makes relatively little difference. The thinner the layer, the greater the error. If the indentation is 1.5 micrometers and the layer to be measured is likewise 1.5 micrometers thick, a measuring error of 50% is produced by the indentation alone, to say nothing of measuring in the nanometer range.

OBJECT AND STATEMENT OF THE INVENTION

The object of the invention is to avoid such indentations to such an extent that the error either does not arise at all or remains negligible.

Probes in the relevant art have:

A probe body having a front region, a coaxial hollow space, an inside and an end face with an annular surface, a coaxial half-pot core having an end face, a coaxial central core, a coaxial winding space around the central core, an outer wall around the winding space, a body of abrasion resistant material having a coaxial, convex end face a coaxial coil device on the central core, a galvanic conductor device between the coil device and one end of the measuring probe, which conductor device is provided in the coaxial hollow space of the probe body, a cable which leads off from one end of the measuring probe, a coaxial annular surface which is arranged at a considerable radial distance from the convex end face of the body of abrasion resistant material, a spring device in the flux of force between the end face of the coaxial half-pot core and the annular surface of the end face of the probe body, the end face of the coaxial half-pot core lying axially in front of the annular surface of the end face of the probe body in the state of rest, and a straight-guiding device between the end face of the coaxial half-pot core and the annular surface of the end face of the probe body.

According to the invention, the object of the invention is achieved by the improvement wherein:

(a) the coaxial half-pot core is axially movable in the probe body, (b) the spring device is in the flux of force between the coaxial half-pot core and the inside of the probe body, and (c) the conductor device comprises a very lightweight conductor framework which bears a very lightweight active circuit.

It has been found that, in the case of the known probes, it is the probe mass together with a contribution of the cable mass that has its energy destroyed by the indentation. The energy destroyed is, after all, $E = \frac{1}{2} \times m \times f^2$. Even if the user is told he should be careful when applying it, nevertheless the speed component increases with a power of two. However, the mass m can be influenced by the design and this is where the invention comes in.

It should be pointed out that on the outside of the probe T3.3 there is indeed a sliding sleeve which is in effective connection with the probe body by a spiral spring. However, this helical spring does not uncouple at the first instant at which the convex end face is applied. At the beginning of contact, the system can be regarded as a rigid body. In addition, the spring force of the helical spring is approximately 100 pounds, which has an effect on the very small convex end face.

The half-pot core may representatively have an outside diameter of 3 mm and is 13 mm thick in the middle. Thus it has virtually a mass of zero. The same applies to the coil device.

The spring device may be very soft, for example in the lower decipond range, and may also itself be very lightweight, since after all the mass to be held is negligible.

The active circuit enables the continuing cable to be thinner and thus lighter and more flexible. Until now, it was approximately 4 mm thick, because a cable had to be chosen so that the cable cores (conductors) would not suffer if the cable was wound up or otherwise twisted. On the other hand, the active circuit can already emit a useful signal, for example phase-coded and/or frequency-coded and/or amplitude-coded, and in the frequency coding in particular it then no longer matters how the cable cores lie in the cable.

The following additional advantageous features of the invention are included in the embodiment described.

A very lightweight tappet element having a front region which is substantially longer than the coaxial half-pot core and substantially shorter than the probe body is provided coaxially in the front region of the probe body, and the coaxial half-pot core is rigidly connected to the front region of the tappet element, and the spring device is provided between the tappet element and the probe body. The effect is that the spring device does not have to engage the coil body, that a carrier is provided for the half-pot core and that the length of the tappet element can be used for longitudinal guidance.

The tappet element has a through-bore in which thin leads of the coil device lie. The effect is that the tappet element is lighter and the extremely thin leads lie protected, not only from a mechanical aspect but also for example against acid vapors, alkaline vapors, etc.

The through-bore lies coaxially. The effect is that the through-bore can be produced easily, the leads have allround protection and the mass distribution of the tappet element is symmetrical, seen axially.

The tappet element is substantially rotationally symmetrical. The effect is that the tappet element can be produced easily, its mechanical properties are easily comprehensible and it adapts to the coaxial design of the probe.

The tappet element is of lightweight metal. The effect is that the tappet element is even lighter. It is best if it consists of titanium.

The tappet element has a length in the centimeter range. The effect is that the tappet element is sufficiently long for guidance but short enough for weight purposes.

The tappet element has in its front region an outwardly projecting collar which protrudes into a receptacle fixed to the probe body, the collar and the receptacle forming at least a first stop which prevents an excessive inward movement of the tappet element. This prevents the spring device from being overloaded if the tappet element is pushed too far into the probe. In addition, it limits how far galvanic lines of the conductor device can be bent off in the interior of the probe.

The collar is L-shaped and the receptacle is complementarily L-shaped, and free members of these L-shapes overlap and form a safeguard against excessive radial deflection of the tappet element. This prevents an excessive deflection in radial direction, which relieves the spring devices and also makes it possible to provide just a small gap between the half-pot core and the front region of the tappet element.

The tappet element has an inner end region that merges with a fixing flange on which the conductor framework that bears the active circuit is fixed. This avoids a flexible line between the half-pot core and the conductor wafer. In fact, the conductor wafer could also be provided such that it is fixed to the body. However, then film conductors would be necessary, which although they are mass-produced articles, their fixing presents soldering problems. The capability exists of producing conductor wafers together with active circuit with a weight of 0.5 grams, which is quite acceptable.

The spring device lies between the tappet element and the inside of the probe body. As a result, the spring device is small and short and the spring forces are introduced into the tappet element.

The spring device is arranged at least substantially radially. The effect is that the spring devices are minimally small and therefore have little mass. With radial arrangement, they can also be fixed well.

The spring device has an outer retaining ring with which it is fixed on the inside of the probe body and an inner retaining ring with which it is fixed on the outside of the tappet element. This creates defined fixing regions on the spring device, making its behavior become clear and assembly simple.

At least one of the retaining rings is continuous. The effect is that the spring device has the same properties on all sides and no preferred or disadvantaged regions occur.

The retaining rings are interconnected by webs which are separated from each other by slits. The effect is that, in spite of the smallness of the spring devices, they can be made soft.

The spring device comprises a wafer. The effect is rigidity in radial direction, so that the convex end face lies fixed in this direction.

The wafer is arranged coaxially. The effect of is to allow for the coaxial design of the probe and to give the wafer the same properties in all directions.

The configuration of the wafer is formed by an etching process. This avoids internal stresses in the wafer, which occur for example during the punching operation, so that the wafer follows Hook's law over its entire stroke.

The spring device is stiff in axial direction with respect to such forces as occur during measuring. The effect is that the spring device can absorb the lateral forces without the occurrence of friction and otherwise required longitudinal guidance mechanisms.

The retaining rings are concentric at least at the outer circumference or at the inner circumference. This allows for the coaxial design of the probe, making the behavior of the spring device clear and the distance from retaining ring to retaining ring the same everywhere. As a result, the components holding the retaining rings in place can likewise we designed clearly and simply.

Two spring devices are arranged at an axial distance from each other. The effect is that the spring devices also prevent any movement of the half-pot core.

The two spring devices are of the same design. This facilitates the production, storage and assembly and of making the behavioral properties become more clear.

The two spring devices are comprised of copper-beryllium. This material is particularly well suited for the purposes concerned.

The tappet element has an inner tube which is offset with a step from the front region of the tappet element, and a first sleeve and a second sleeve are seated on the inner tube and the two springs have inner retaining rings rigidly grasped in one case between the step and the first sleeve and in a second case between the first sleeve and the second sleeve. The effect is that the tappet element remains lightweight, clear in design, that few parts are required and that a secure seating of the inner retaining ring on a very large surface is obtained.

A fixing flange on the tappet element and the second sleeve are of one piece. This facilitates assembly and mutual retention.

The first sleeve has exactly opposite it a third sleeve which is rigidly connected to the probe body having two end faces and opposing end faces fixed to the probe body together with the end faces on the third sleeve hold the outer retaining rings of the two spring devices. The effect is that the outer retaining ring can be retained over a large area and mechanically clearly as well as simply in terms of assembly.

When a stroke takes place in the lower to mid-tenth of a millimeter range, the spring force of the spring device lies in the lower- to mid-decapond range. These parameters have proved very successful in the case of an actual probe.

The weight of the conductor framework plus active circuit lies in the tenth of a gram range. These features are also possible without monolithic, integrated and thus, in view of the numbers, currently scarcely cost-effective semi-conductor circuits, and do not prevent the object of the invention being achieved.

The coaxial half-pot core is covered on its outside in a fluid-tight manner by an acid and base resistant and abrasion resistant coating. This avoids having to clean the probe after each measurement when measuring in corresponding environments. Rather, many points can be measured one after the other.

The coating is a PTFE. This coating is very abrasion resistant and also easy to machine.

The coating is a polyimide. The coating is not only abrasion resistant and acid and alkaline resistant. In addition, it does not absorb any moisture, so that the coil device is also no influenced by moisture.

The coating also covers, at least indirectly, the circumference of the half-pot core. This prevents a lateral ingress of vapors or liquid to the half-pot core.

At least the front region of the probe body is surrounded coaxially by a sliding sleeve having a front end face that can be pushed back further than the coaxial annular surface of the probe body in the state of rest of the sliding sleeve. The front end face of the sliding sleeve lies in front of the convex end face. The radial backlash between the sliding sleeve and the probe body is very small. A helical spring, which urges the sliding sleeve into its forward position, lies between the sliding sleeve and the probe body. And, a coaxial gripping sleeve is provided around the sliding sleeve, is firmly connected to the probe body and is separated by a gap from the sliding sleeve in a region overlapping the sliding sleeve. These features are suitable in particular for probes that have to measure on very soft material and-/or have to measure in the lower measuring ranges of this measuring technique.

The cable is thin. This minimizes the properties of the cable which are damaging with respect to the invention.

The cable is in the range of 3 mm or less in diameter. These values have proved successful with even far better measuring properties.

DESCRIPTION OF THE DRAWINGS

The invention is now described with reference to exemplary embodiments. In the drawings.

DETAILED DESCRIPTION OF REPRESENTATIVE EMBODIMENTS

Figure 1:
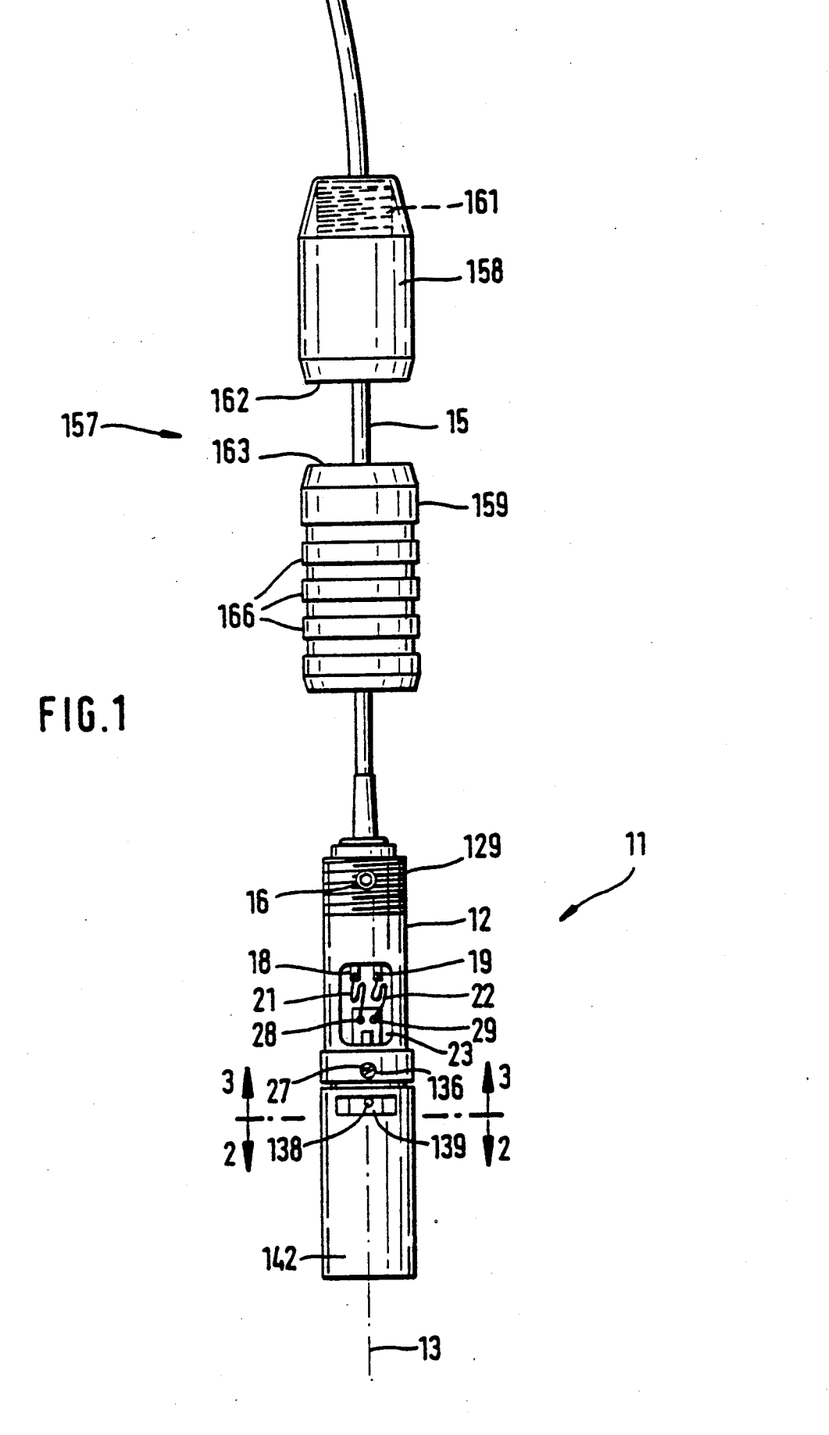
FIG. 1 shows a measuring probe partially exploded.
Figure 2:
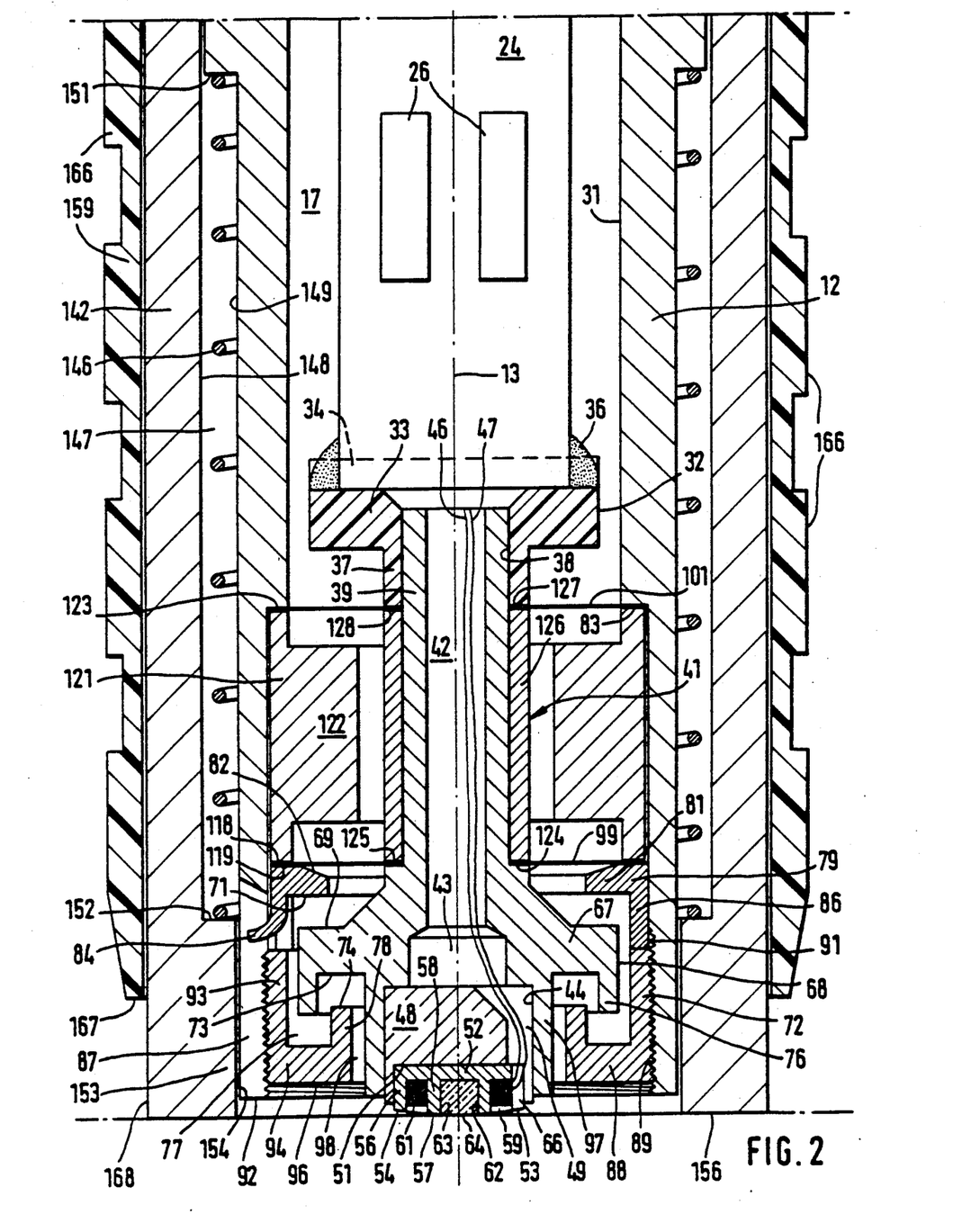
FIG. 2 shows a radial section through the lower to middle region of the assembled probe according to FIG. 1, shown to the same scale.

A single-pole measuring probe 11 has a body 12 consisting of aluminum, which is substantially tubular and coaxial to a geometrical longitudinal axis 13. The measuring probe 11 is connected via a two-core cable 15 of 2.5 mm thickness, fixed against tensile stress by a grub screw 16. Protruding into the upper region of a coaxial hollow space 17 are two pins 18, 19 to which two very flexible litz wires 21, 22 are connected. In order that the upper ends of the litz wires 21, 22 are soldered on, a window 23 is provided over the middle of the one-piece body 12. There a conductor wafer 24 can also be seen. This is 5.9 mm wide and 29.3 mm long. Since the representations of the other parts are to the same scale, the dimensions of the other parts can be obtained. The geometrical longitudinal axis 13 runs centrally through the conductor wafer 24, with respect to its height, its width and also its length. It bears electric components 26 and a least one active component 27, which are only symbolically indicated however. The components 26, 27 have their output in the soldering points 28, 29 and emit a frequency-modulated voltage corresponding to the measurement result. Active component 27 is an integrated circuit that includes active amplifying means that produce coded signals (i.e. the frequency modulated voltage) responsive to the magnetic flux conditions detected by coil 61 (i.e. the measurement result).

Active component 27 is a part of a circuit detector for detecting variations in current resulting from magnetic flux conditions detected by coil 61. Component 27 is located inside the probe body 12 a small distance from coil 61. Cable 15, therefore, carries currents and signals that are less subject to interferences to low level signals. Active component 27 is included in a conductor arrangement, 18, 19, 21, 22, 26, 27, 46 and 47, that serves as an intermediate connection between the coil 61 and cable 15. The litz wires 21, 22 are much longer than in fact corresponds to the greatest distance between the pins 18, 19 and the soldering points 28, 29. They are designed as loops and offer virtually no mechanical resistance when the conductor wafer 24 approaches the pins 18, 19. The conductor wafer 24 lies freely in the hollow space 17 and does not touch its inside wall 31. A coaxial and circular-cylindrical fixing flange 32 is coaxial to the longitudinal axis 13. Its disk-shaped head 33 is provided, in the plane of the drawing of FIG. 2, with a slit 34, in which the lower edge region of the conductor wafer 24 is fixed by adhesive 36. The fixing flange 32 does not touch the inside wall 31 anywhere and goes downwards into a circular-cylindrical annular neck 37, which likewise lies coaxially. Centrally, the fixing flange 32 has a through-bore 38, provided upwards with a chamfer. The fixing flange 32 consists of plastic and is thus on the one hand better able to adhere with respect to the conductor wafer 24 consisting of plastic and also has a high electric insulation resistance. In the through-bore 38 there is fitted axially immovably, connected to the fixing flange 32, the upper region of a central tube 39 of a tappet element 41, which consists of titanium. The central tube 39 has a through-bore 42, which at the bottom goes into a first cylinder space 43 and even further down into a still larger cylinder space 44. From the conductor wafer 24 there leads downwards two very thin lines 46, 47. Immovably seated in the cylinder space 44 is a core housing 48, which in fact takes up the entire cylinder space 44, but is provided with a slit 49, which lies in the plane of the drawing of FIG. 2, so that the lower region of the lines 46, 47 can pass further downwards. In a circular-cylindrical receptacle 51 at the end of the core housing 48, there is seated a half-pot core 52. It is provided downwards with a hemispherical surface 53, on which the end face 54 of its outer wall 56 and the end face 57 of its inner wall 58 also lie. Between the outer wall 56 and the inner wall 58 there lies a coaxial annular winding space 59 for a coil 61. The winding space 59 is cast at the bottom, so that the coil 61 is protected and retains its position. Coaxially to the geometrical longitudinal axis 13, the half-pot core 52 has a blind hole 62, which is open at the bottom and in which a sapphire 63 is seated, the convex end face 64 of which lies in the hemispherical surface 32. In order that the lines 46, 47 can pass through the slit 49 into the winding space 59, the half-pot core 52 likewise has a slit 66 as a continuation of the slit 49. The slit 49 and 66 is cast with resin.

The tappet element 41 has in its lower region 67, according to FIG. 2, an outwardly projecting, coaxial, radial collar 68. It lies approximately on a level with the cylinder space 43, above the cylinder space 44. Its upwardly directed coaxial, radial annular surface 69 forms the one side of a stop, the other side of which is formed by a complementary annual surface 71, which is part of a C-shaped or G-shaped receptacle 72, which is arranged so as to be fixed to the body. After a distance of 0.8 mm, the annular surface 69 strikes the annular surface 71. A downwardly directed coaxial, radial annular surface 73 also forms a stop half together with a smaller, radial and coaxial annular surface 74 of the receptacle 72. After a movement of 0.8 mm outwards, the annular surface 73 strikes the annular surface 74. The collar 68 has an axially directed, coaxial, downwardly pointing, narrow member 76, which partially protrudes into the lower inlet 77 of the receptacle 72 and there partially overlaps axially an inwardly directed member 78. The clearance between the one member 78, representing a circular ring, and the other similarly formed member 76 is 0.3 mm on both sides in each case and the lower region 67 can, for example, be deflected to the right or left by this amount before an overload protection occurs. The receptacle 72 is of two parts and consists of an inner L-ring 79, the cross-member 81 of which bears the downwardly directed annular surface 71 and in normal operation does not touch the collar 68 anywhere. At the top, the cross-member 81 has a downwardly directed chamfer 82, in order that a spring element, still to be discussed, can bend unhindered. On the outside, the L-ring 79 is held by the inner wall 31, which has a greater diameter there, due to an outwardly directed step 83, than for example in the region of the conductor wafer 24. A lug 84 of the longitudinal member 86 is bent outwards into an axially and radially extending slit 87 of the body 12, which lies in the plane of the drawing of FIG. 2. Therefore, the L-ring 79 and the parts adjoining it can no longer turn. The L-ring 79 is thus at the same time also a locking washer. The second part of the receptacle 72 consists of a C-ring 88. It has an external thread 89, with which it is screwed into an internal thread 91, which begins at the bottom on an annular surface 92 of the body 12. The outer wall 93 of this C-ring 88 extends up to the level of the cylinder space 43. Its radial, coaxial and circular-cylindrical cross-member 94 is relatively thick for mechanical protection and lies with its outer surface 96 above the annular surface 92. From the cross-member 94, the upwardly directed member 78 goes off. Between the member 78, the cross-member 94 on the one hand and the holding wall 97 of the tappet element 41, bounding the cylinder space 44 on the outside, there is a small gap 98, which hinders or excludes the ingress of foreign bodies. As can be seen, the gap 98 is the beginning of an also sealing labyrinth, which is directed outwards after the gap 98, then again directed downwards, then again directed outwards, then directed upwards and, underneath the annular surface 71, is again directed inwards. Once the gap 98 has narrowed to zero, it also serves at the same time as radial stop against overloading and excessive deflection of the tappet element 41 and of the parts connected to it, in radial direction.

Figure 4:
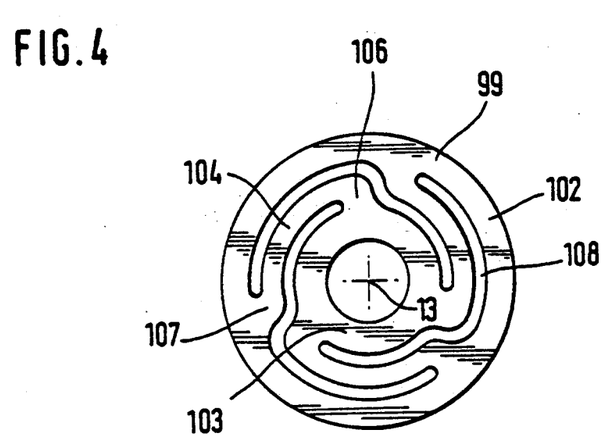
FIG. 4 shows a plan view of a spring platelet, on a scale of 1:5 compared to FIG. 1.
Figure 5:
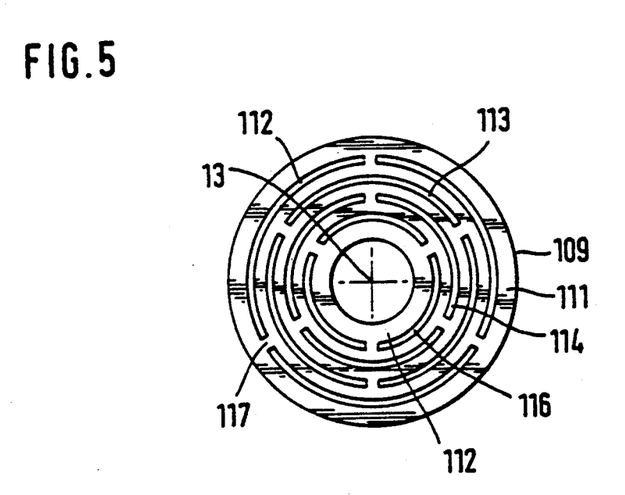
FIG. 5 shows the plan view of a further spring platelet, on a scale of 1:5 compared to FIG. 1.
Figure 6:
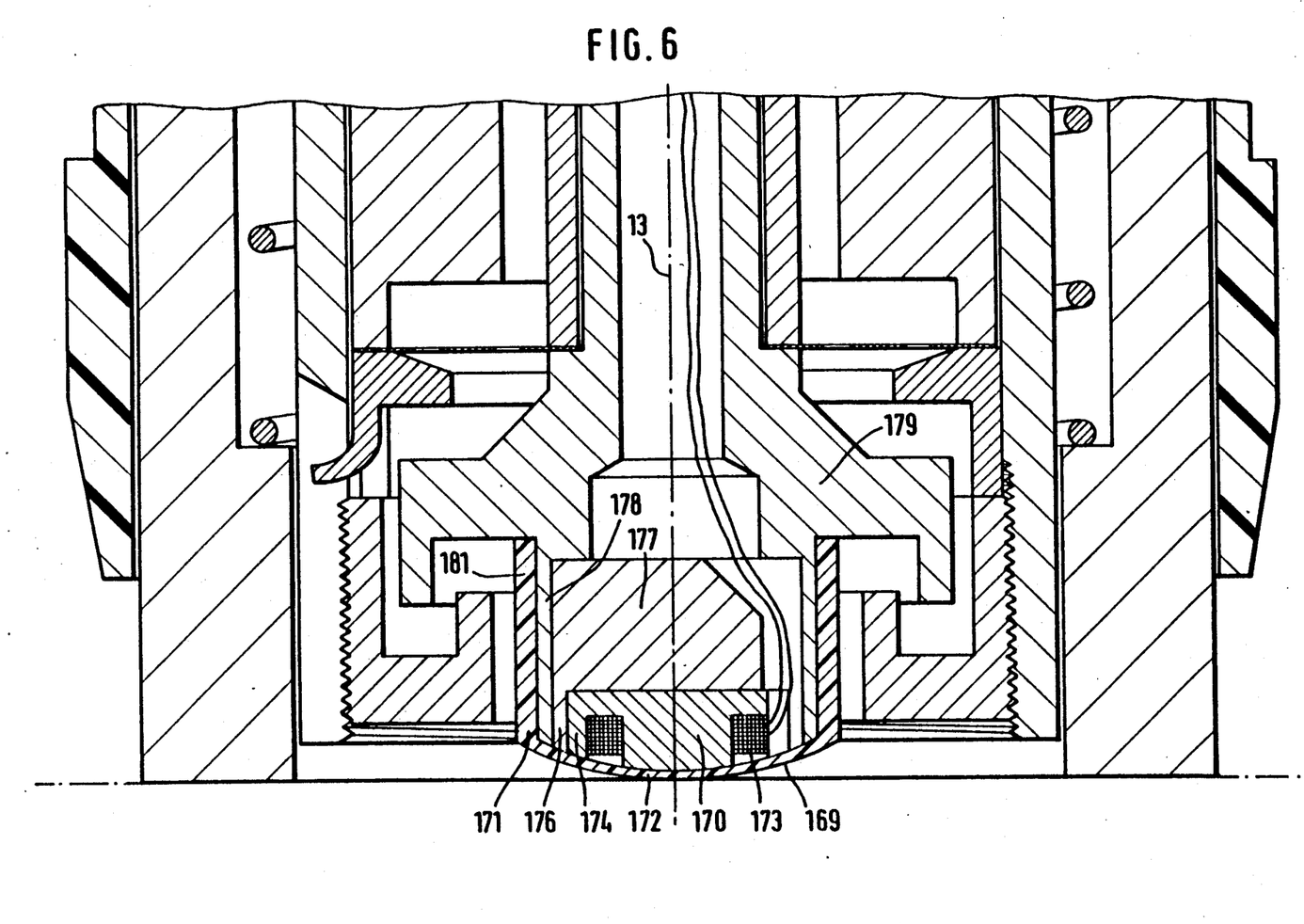
FIG. 6 shows the lower region of FIG. 2 once again, enlarged by a factor of 1.55 compared to FIG. 1, for a second exemplary embodiment.

Two identical spring platelets 99, 101 position the tappet element 41, and the parts connected to it, relative to the body 12, the half-pot core 52 in particular being retained extremely accurately coaxially to the geometrical longitudinal axis 13. The spring platelet 99 is 0.05 mm thick and consists of Cu-Be2. Its outside diameter is 9.6 mm and the inside diameter is 2.8 mm. It lies concentrically to the geometrical longitudinal axis 13 and has an outer retaining ring 102 and an inner retaining ring 103. These are continuously annular. Three spring arms 104 are provided angularly offset by 120° in each case, which run over the majority of their length on radii about the geometrical longitudinal axis 13 and are joined in their end regions by roots 106, 107, on the one hand to the inner retaining ring 103 and on the other hand to the outer retaining ring 102. Since the roots 106, 107 have extremely rounded transitions, the extended S-shaped slits 108 are produced. According to FIG. 5, spring platelets 109, which likewise have an outer retaining ring 111 and an inner retaining ring 112, may also be used. Here slits 112, 113, 114 and 116 are provided, the slits being somewhat less than 120° long in each case. As a result, 0.4 mm wide webs 117 remain between them, to be precise three webs 117 in each case, due to the 120° arrangement. However, the group of slits denoted by 113 are offset by 60° with respect to the group of slits denoted by 112. The slits denoted by 114 have the same offset with respect to the slits denoted by 113, etc. The pattern shown in FIG. 6 is thus produced. The spring platelet 109 is 0.2 mm thick.

According to FIG. 2, the outer retaining ring 102 of the spring platelet 99 is clamped between the radial, upwardly directed end face 118 of the cross-member 81 and the downwardly directed end face 119 of a sleeve 121. The sleeve 121 is circular-cylindrical and coaxial and does not touch the tappet element 41 anywhere. The sleeve 121 can be pushed in from below with backlash towards the inner wall 31 and has an inwardly directed bulge 122. At the top, the sleeve 121 has an upwardly directed end face 123, between which and the step 83 the outer retaining ring 102 of the spring platelet 101 is clamped in place. A further effect of this design can thus be seen: If the C-ring 88 is screwed upwards, it presses the L-ring 79 upwards, without being able to twist it due to the lug 84. The latter presses the sleeve 121 upwards and consequently the outer retaining rings 102 of the spring platelets 99, 101 are also held exactly, level and sharp-edged, both by non-positive connection and also by positive connection. At the level of the end face 119, the central tube 39 has a radial, coaxial, upwardly directed end face 125, on which the inner retaining ring 103 of the spring platelet 99 rests. On this upper side, again there lies a radial, coaxial, downwardly directed end face 124 of a spacer sleeve 126, which fits with its inside diameter onto the central tube 39. At the level of the end face 123, the spacer sleeve 126 has an upwardly directed end face 127, which is coaxial, radial and level and on which the underside of the inner retaining ring 103 of the spring platelet 101 rests. On the upper side of the inner ring 103 lies a downwardly directed end face 128 of the annular neck 37, which is radial, coaxial and level. If the fixing flange 32 is pressed downwards with collar 86 held in place, and the fixing flange 32 is fixed by adhesive on the central tube 29, the inner retaining rings 103 of the spring platelets 99, 101 are held non-positively and positively in place.

Figure 3:
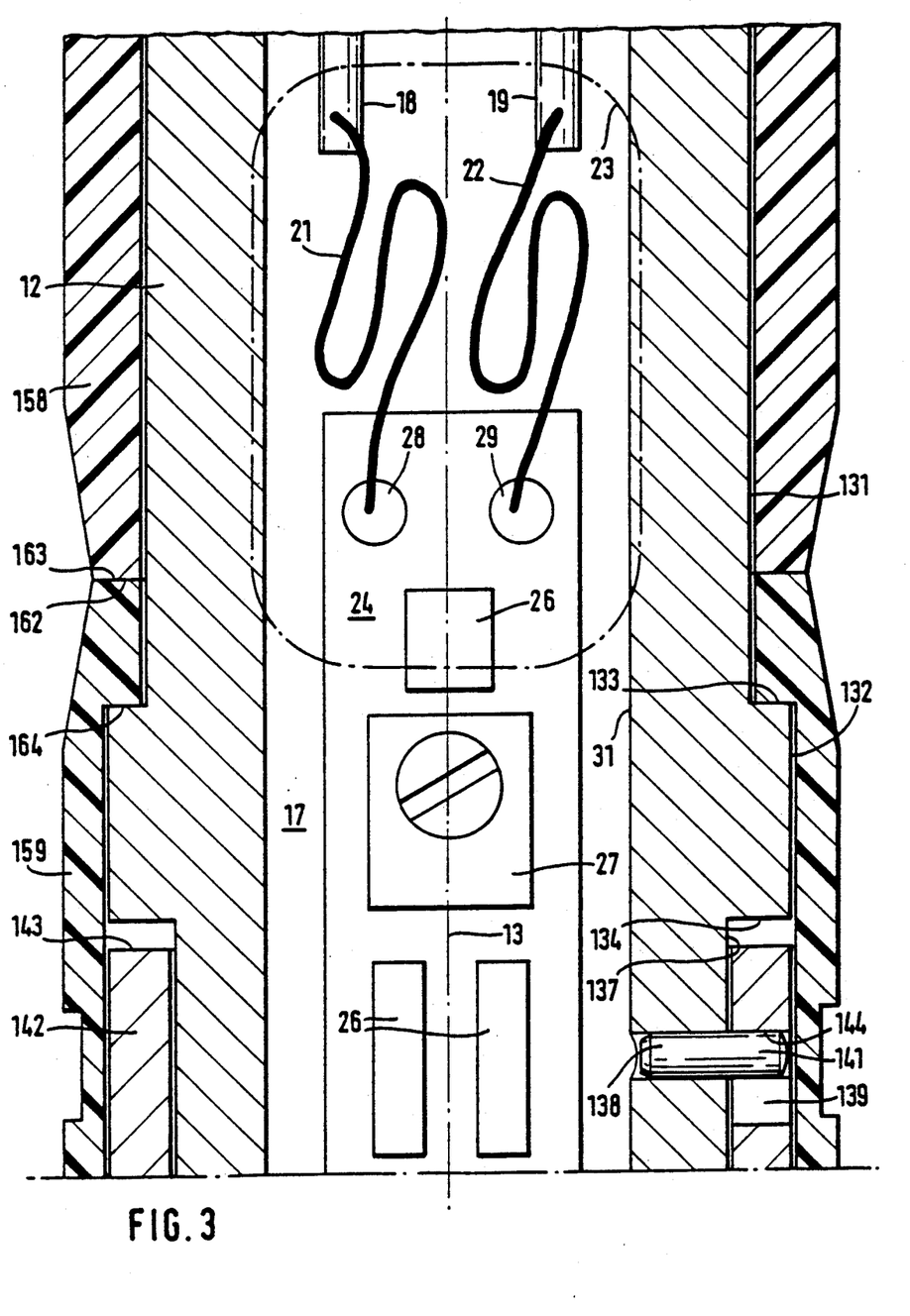
FIG. 3 shows a section through the assembled probe of FIG. 1, shown to the same scale.

The body 12 has in the region of the grub screw 16 right at the top an external thread 129. Its outer surface 131 is circular-cylindrical up to an outer ring 132. This has a radial, coaxial, upwardly directed, annular end face 133 and a downwardly directly, radial, coaxial and annular, but further inwardly jutting end face 134, which faces downwards. In the outer ring 132 there is a through-hole 136, through which one of the passive components 26 on the conductor wafer 24 can be adjusted with a screwdriver. Underneath the end face 134, the body 122 goes over into a coaxial, circular-cylindrical outer surface 137, the outside diameter of which according to FIG. 3 is smaller than the outside diameter of the outer surface 131. Underneath the end face 134, the outer surface 137 extends 6.8 mm wide. Knocked perpendicularly into a corresponding bore, so as to be immovable, is a radial stop pin 138. To the extent that the stop pin 138 protrudes from the outer surface 137 with its head, the head 141 is seated in a tangential slit 139, which runs in circumferential direction of a circular-cylindrical sliding sleeve 142, as FIG. 1 shows particularly clearly. Axially, the tangential slit 139 is wide enough that the upwardly directed, coaxial and annular end face 143 can strike against the end face 134. The stop pin 138 allows a downwardly directed movement of the sliding sleeve 142 only until the head 141 strikes against the upper wall 144 of the tangential slit 139. Downwards relative to the body 12, the sliding sleeve 142 is . . . (sic) by a helical spring 146, which is seated in a circular-cylindrical, coaxial hollow space 147, which is formed on the outside by the inner wall 148 of the sliding sleeve 142 and on the inside by an outer wall 149 of the body 12, which is produced by a coaxial downward-facing shoulder 151 on the outer surface 137. The wall 149 runs level up to the annular surface 92. At the bottom, the helical spring 146 is supported on an upwardly directed, coaxial, annular end face 152, which is produced by the fact that the sliding sleeve 142 has approximately from the upper region of the collar 68 a diameter reduction 153. There the sliding sleeve 142 guides itself with slight backlash by its coaxial, circular-cylindrical inner wall 154 against the outer wall 149 of the body 12. At the top, the guidance between the outer surface 137 and the inner wall 148 takes place with slight backlash. The expansive stress of the helical spring 146 makes the head 141 bear against the wall 144. Its force is about 60 ponds and is thus substantially less than the spring force of the probe T3.3. The sliding sleeve 142 has at the bottom a relatively large, polished, coaxial, radial and annular end face 156, which in the view of FIG. 2 aligns in height with the south pole of the hemispherical surface 53 and thus lies lower than the annular surface 92.

A gripping sleeve 157 consists of an upper part 158 and a lower part 159. While the sliding sleeve 142 is of aluminum, the gripping sleeve 156 is of plastic and thus only about 5 grams heavy. The upper part has an internal thread 161, which can be screwed onto the external thread 129. In the screwed in state, its coaxial and downwardly directed end face 162 presses onto the complementary, upwardly directed end face 163 of the lower part 159. The lower part 159 is in this case pressed by a downwardly directed shoulder 164, provided close to the end face 163, against the end face 133, as a result of which the gripping sleeve 157 is fixed in all directions. For better holding with the hand, the lower part 159 has gripping rings 166. The lowermost, downwardly directed end face 156 leaves the sliding sleeve 142 free at the bottom up to about the level of the cylinder space 44 and tapers before this. The gripping sleeve 157 has a small distance from the circular-cylindrical outer surface 168 of the sliding sleeve 142. It also serves to cover the grub screw 16, the window 23, the through-hole 136 and the tangential slit 139 together with head 141. In the finished assembled state, the gripping sleeve 157 cannot be twisted with respect to the body 12, while the sliding sleeve 142 can turn by approximately 30°, according to the length of the tangential slit 139, until it stops against the stop pin 138.

I claim:

1. A single-pole, electromagnetic, active measuring probe (11) for the measurement of thin layers, comprising a probe body (12) with a longitudinal axis (13) having a front region, a hollow space (17) coaxial with the longitudinal axis (13), an inner wall (31), and an end face with an annular surface (92), a half-pot core (52) mounted in the probe body (12) coaxial with the longitudinal axis (13), and having an end face (53), a central core portion (58) coaxial with the longitudinal axis (13), a winding space (59) around the central core portion (58) coaxial with the longitudinal axis (13), and an outer wall (56) around the winding space (59), a body of abrasion resistant material (63) having a coaxial, convex end face (64) that at least partially covers the central core portion (58), a coil device (61) coaxial with the longitudinal axis (13) in the coaxial winding space (59), a galvanic conductor device (18, 19, 21, 22, 26, 27, 46, 47) connected between the coil device (61) and one end of the measuring probe (11), which conductor device (18, 19, 21, 22, 26, 27, 46, 47) is provided in the coaxial hollow space (17) of the probe body (12), a cable (15), which leads off from said one end of the measuring probe, said annular surface, 92 being arranged coaxial with the longitudinal axis (13) and at a considerable radial distance from the convex end face (64) of the body of abrasion resistant material for limiting axial movement of the half-pot core (52) in the probe body (12), a spring device (99) in the force path between the end face (53) of the coaxial half-pot core and the annular surface (92) of the end face of the probe body, the end face of the coaxial half-pot core lying axially in front of the annular surface (92) of the end face of the probe body in the state of rest, a straight-guiding device between the end face (53) of the coaxial half-pot core and the annular surface (92) of the end face of the probe body for guiding movement of the half-pot core (52) in the probe body (12), and the improvement wherein:

(a) the coaxial half-pot core (52) is axially moveable in the probe body (12), (b) the spring device is in the force path between the coaxial half-pot core (52) and the inner wall (31) of the probe body (12), and (c) the conductor device comprises a very lightweight conductor framework (24), which bears a very lightweight active circuit (26, 27) for at least partly forming a measuring signal.

2. The probe as claimed in claim 1, wherein a very lightweight tappet element (41), having a front region (67) which is substantially longer than the coaxial half-pot core (52) and substantially shorter than the probe body (12), is provided coaxial with the longitudinal axis (13), and in the front region of the probe body (12), and the coaxial half-pot core (52) is rigidly connected to the front region (67) of the tappet element (41), and the spring device (99, 101) is provided between the tappet element (41) and the probe body (12).

3. The probe as claimed in claim 2, wherein the tappet element (41) has a through-bore (42), in which thin leads (46, 47) of the coil device (61) lie.

4. The probe as claimed in claim 3, wherein the through-bore (42) is coaxial with the longitudinal axis (13) of the probe body (12).

5. The probe as claimed in claim 2, wherein the tappet element (41) is substantially rotationally symmetrical.

6. The probe as claimed in claim 2, wherein the tappet element (41) is of lightweight metal.

7. The probe as claimed in claim 2, wherein the tappet element (41) has a length in the centimeter range.

8. The probe as claimed in claim 2, wherein the tappet element (41) has in its front region (67) an outwardly projecting collar (68) which protrudes into a receptacle (72) fixed to the probe body, the collar (68) and the receptacle (72) forming at least a first stop (69, 71), which prevents an excessive inward movement of the tappet element (41).

9. The probe as claimed in claim 8, wherein the collar (68) is L-shaped and the receptacle (72) is complementarily L-shaped, and free members (76, 78) of these L-shapes (67, 76, 94, 78) overlap and form a safeguard against excessive radial deflection of the tappet element (41).

10. The probe as claimed in claim 2, wherein the tappet element (41) has an inner end region that merges with a fixing flange (32), on which the conductor framework (24) that bears the active circuit (26, 27) is fixed.

11. The probe as claimed in claim 2, wherein the spring device (99, 101) lies between the tappet element (41) and the inner wall (31) of the probe body (12).

12. The probe as claimed in claim 11, wherein the spring device (99, 101) is arranged at least substantially radially relative to the longitudinal axis (13) of the core body (12).

13. The probe as claimed in claim 12, wherein the spring device (99, 101) has an outer retaining ring (102), with which it is fixed on the inside (31) of the probe body (12), and an inner retaining ring (103), with which it is fixed on the outside of the tappet element (41).

14. The probe as claimed in claim 13, wherein at least one of the retaining rings (102, 103) is continuous.

15. The probe as claimed in claim 13, wherein the retaining rings (102, 103) are interconnected by webs (104), which are separated from each other by slits (108).

16. The probe as claimed in claim 12, wherein the spring device comprises a wafer (99, 101).

17. The probe as claimed in claim 16, wherein the wafer (99, 101) is arranged coaxially with the longitudinal axis (13) of the probe body (12).

18. The probe as claimed in claim 16, wherein the configuration of the wafer (99; 101) is formed by an etching process.

19. The probe as claimed in claim 1, wherein the spring device (99, 101) is stiff in its radial direction relative to the longitudinal axis (13) of the probe body (12) with respect to such forces as occur during measuring.

20. The probe as claimed in claim 13, wherein the retaining rings (102, 103) are concentric at least at the outer circumference or at the inner circumference.

21. The probe as claimed in claim 11, wherein two spring devices (99, 101) are arranged at an axial distance from each other between the tappet element (41) and the probe body (12).

22. The probe as claimed in claim 21, wherein the two spring devices (99, 101) are of the same design.

23. The probe as claimed in claim 22, wherein the two spring devices are comprised of copper-beryllium.

24. The probe as claimed in claim 2, wherein the tappet element (41) has an inner tube (39), which is offset with a step (125) from the front region (67) of the tappet element (41), a first sleeve (126) and a second sleeve (37) are seated on the inner tube (39) and the spring device (99, 101) comprises two springs that have inner retaining rings (103) rigidly grasped in one case (99) between the step (125) and the first sleeve (126) and in a second case (101) between the first sleeve (126) and the second sleeve (37).

25. The probe as claimed in claim 24, wherein a fixing flange (33) on the tappet element (41) and the second sleeve (37) are of one piece.

26. The probe as claimed in claim 24, wherein the first sleeve (126) has exactly opposite it a third sleeve (121), which is rigidly connected to the probe body (12), having two end faces (119, 123), and the probe body (12) has end faces (83) fixed to the probe body (12) that oppose the end faces (119, 123) on the third sleeve (121) and together with the end faces (119, 123) on the third sleeve hold the outer retaining rings (102) of the two spring devices (99, 101).

27. The probe as claimed in claim 1, wherein, when movement of the spring device (99, 101) takes places in the lower to mid-tenth of a millimeter range, the spring force of the spring device (99, 101) lies in the lower-to mid-decapond range.

28. The probe as claimed in claim 1, wherein the weight of the conductor framework (24) plus active circuit (26, 27) lies in the tenth of a gram range.

29. The probe as claimed in claim 1, wherein the coaxial half-pot core (52) is covered on its outside in a fluid-tight manner by an acid and base resistant and abrasion resistant coating (172).

30. The probe as claimed in claim 29, wherein the coating (172) is a PTFE.

31. The probe as claimed in claim 29, wherein the coating (172) is a polyimide.

32. The probe as claimed in claim 29, wherein the coating (181) also covers, at least indirectly, the circumference of the half-pot core (52).

33. The probe as claimed in claim 1, wherein at least the front region of the probe body (12) is surrounded coaxially by a sliding sleeve (142) having a front end face (156) that can be pushed back further than the coaxial annular surface (92) of the probe body (12), in the state of rest of the sliding sleeve (142), the front end face (156) of the sliding sleeve lies in front of the convex end face (64), the radial backlash between the sliding sleeve (142) and the probe body (12) is very small, a helical spring (146), which urges the sliding sleeve (142) into its forward position, lies between the sliding sleeve (142) and the probe body (12), and a gripping sleeve (157) coaxial with the longitudinal axis is provided around the sliding sleeve (142), is firmly connected to the probe body (12) and is separated by a gap from the sliding sleeve (142) in a region overlapping the sliding sleeve (142).

34. The probe as claimed in claim 1, wherein the cable (15) is thin.

35. The probe as claimed in claim 34, wherein the cable (15) is in the range of 3 mm or less in diameter.

* * * * *